Figure 1:
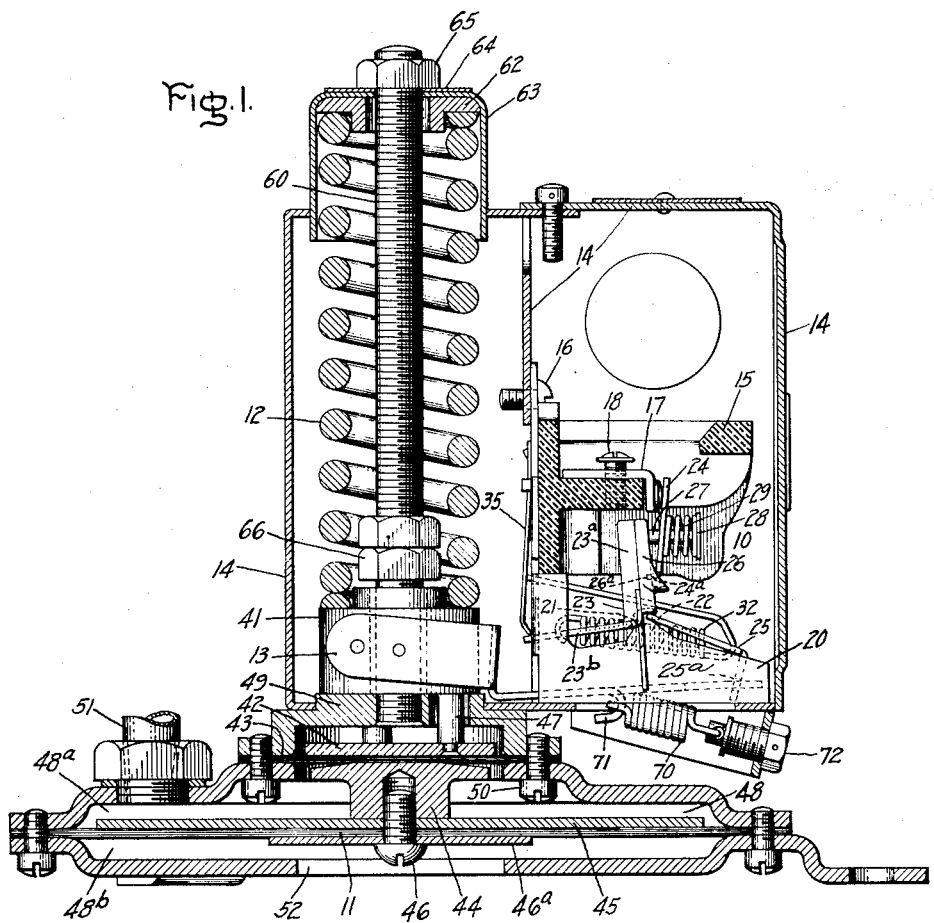

April 21, 1931.      V. W. LEONARD      1,802,178

AUTOMATIC PRESSURE REGULATOR

Filed July 31, 1928

Inventor:
Vincent W. Leonard,
by Charles E. Tullar
His Attorney.

Patented Apr. 21, 1931

1,802,178

UNITED STATES PATENT OFFICE

VINCENT W. LEONARD, OF FORT WAYNE, INDIANA, ASSIGNOR TO GENERAL ELECTRIC COMPANY, A CORPORATION OF NEW YORK

AUTOMATIC PRESSURE REGULATOR

Application filed July 31, 1928. Serial No. 296,549.

My invention relates to automatic pressure regulators, particularly to pressure regulators used in an electrically driven installation where it is desired to automatically maintain a pressure within certain limits, and has for its object the provision of an automatic pressure regulator which is simple, compact and light in construction, and durable, effective and convenient in operation.

It has been customary to operate the control switch of pressure regulators by a diaphragm which is exposed to, and moved in response to changes in the pressure of the regulated system. A spring is usually provided to oppose the effect of the pressure upon the diaphragm and to determine the pressures at which the switch will operate. These regulators can be adjusted to maintain various different pressures on a system and can also be adjusted so that the range of pressures, that is the difference in the pressures at which the switch opens and closes, may be varied. The pressure regulators heretofore used have been of a rather complicated and expensive structure and furthermore have been designed and constructed either to operate on a low pressure or vacuum system, or upon a system employing relatively high pressures, those satisfactory for one system being unsatisfactory for the other. My invention, therefore, contemplates the provision of a pressure regulator, one not only of simplified and durable construction but also one which may be readily adapted to systems operating on either high or low pressures.

In carrying my invention into effect in one form thereof I provide the regulator with an electric switch and a lever for actuating the switch. A diaphragm exposed to a varying pressure is arranged to operate the lever to open the switch and a compression spring opposing the opening movement of the switch is arranged to operate the lever to close the switch. I provide a second spring connected to the actuating lever whereby the effect of the compression spring will be modified when the lever is moved to open the switch so that the pressure range of the regulator may be conveniently varied.

I prefer to employ an electric switch of the snap-action type, that is, one in which a spring is tensioned and moved to definite critical positions so as to quickly open and close the switch. In order to insure the effective snap actuation of the switch in an opening direction, I provide a latch to hold the switch in its closed position and arrange the tensioned spring to release the latch as the spring is moved through its critical position in the switch opening direction.

In order that my regulator may be conveniently employed in various systems operating on widely different pressures without materially changing its structure, I provide two pressure chambers, one arranged to operate on relatively high pressures and the other arranged to operate on relatively low pressures. Either of the pressure chambers may be readily fitted to the pressure regulator so as to operate the switching mechanism.

Figure 2:
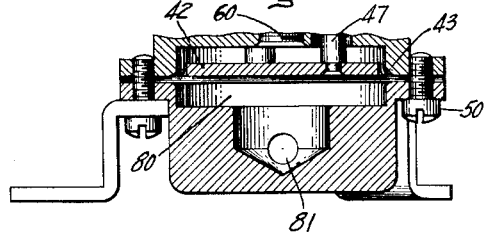

For a more complete understanding of my invention reference should be had to the accompanying drawing in which Fig. 1 shows a sectional view in elevation of a pressure regulator embodying my invention, the regulator being provided with a pressure chamber constructed to operate on low pressure or vacuum systems; and Fig. 2 shows a pressure chamber provided for the regulator so that it may be employed on high pressure systems.

Referring to the drawing I have shown my invention in one form as applied to a pressure regulator for an electrically driven installation, the regulator being provided with an electric switch which is operated in an opening direction by means of a diaphragm exposed to the pressure to be regulated and in a closing direction by means of a compression spring which opposes the actuating movement of the diaphragm. As shown, the pressure regulator comprises an electric switch mechanism 10 which is actuated in an opening direction by means of a diaphragm 11 and in a closing direction by means of a compression spring 12. A suitable lever 13 is interposed between the switching mechanism and the actuating diaphragm and spring, whereby but a very small movement of the diaphragm and spring is necessary to operate the switch, the lever serving to magnify this small movement to the desired degree.

It will be understood that in electrically driven installations where it is desired to automatically maintain a pressure within certain limits, a compressor or vacuum pump is driven by an electric motor. The regulator is arranged to automatically open the circuit to the motor when the pressure or vacuum of the system had reached a predetermined high value, and to close the circuit to the motor when the pressure or vacuum has reached a predetermined low value.

The switching mechanism 10 comprises a unit detachably connected to the casing 14 of the regulator. As shown, the switching mechanism 10 comprises a support 15 of moulded insulating material, as bakelite, secured to the casing 14 by means of a screw 16. The stationary contacts 17 are removably secured to the support 15 by means of terminal screws 18 so that the contacts may be readily removed for repair or replacement. A supporting member 20 for the movable elements of the switching mechanism is secured to the insulating support 15, the supporting member 20 being provided with a pair of opposed V slot bearings 21 and 22. An arm 23 on which the movable switch contacts 24 are mounted is provided with a knife edge pivoted in the V slot 21, and an arm 25 for operating the supporting arm 23 is provided with a knife edge pivoted in the V slot 22. The arm 25 also is provided with a slot 25a through which the free end of the pivoted operating lever 13 projects so as to detachably connect the operating lever 13 with the switch mechanism when the switch unit is detachably connected to the casing 14 of the regulator. As shown, the contact arm 23 is formed as a right angle with knife edge at its vertex fulcrumed in the slot 21. The upright portion 23a of the arm 23 serves to support the contacts 24 and the portion 23b extending therefrom serves to connect the arm with the operating mechanism. In order to insure firm engagement between the stationary contacts 17 and the movable contacts 24, the movable contacts 24 are so mounted upon the arm 23 as to permit relative movement therebetween. The upper portion of the arm 23a is provided with a suitable insulating plate 26 into which stud bolts 27 are mounted. The movable contacts 24 are formed with projecting portions 24a which are fitted into recesses 26a provided in the insulating plate 26 and are further provided with apertures intermediate their ends through which the stud bolts 27 project. The bolts 27 are provided at their outer ends with washers 28, compression springs 29 being mounted between the contact members 24 and the washers 28 so that when the switch is closed the contacts will be held in firm interengagement and yet relative movement between the contacts 24 and the arm 23 will be permitted.

A suitable tension spring 32 serves to impart motion to the arm 23 and further serves to securely hold the arms 23 and 25 in firm engagement with the knife edges 21 and 22 respectively. As shown, the tension spring 32 is formed as a coil, one end of the spring extending through an aperture in the free end of portion 23b of the arm 23, and the other end of the spring extending through an aperture in the free end of the operating arm 25, the latter end being folded back longitudinally of the length of the coil for a purpose to be hereinafter described.

It will be observed that when the operating arm 25 is moved in a counterclockwise direction, as viewed in Fig. 1, to a position in which the projection portion 23b and the arm 25 are in substantial alignment, that the spring 32 will be tensioned to an appreciable degree and will be carried into such a position that any further movement of the operating arm 25 will throw the center line of the spring over the center line of the aligned arms, and the arm 23 will be biased to move in a clockwise direction, as viewed in Fig. 1, so as to move the contacts 24 out of engagement with the stationary contacts 17.

Thus, when the operating arm 25 has moved into a position of alignment with the projecting portion 23b, the spring 32 will have been brought into such a critical position that any further movement of the arm 25 in the counterclockwise direction will immediately throw the axis of the spring above the position of alignment. The arm 23 will then be quickly moved by the spring 32 to open the switch, the rapidity of the opening movement of the switch depending upon the strength of the spring 32. It will be understood that the energy stored in the spring by the arm 25 as it is moved to its critical position will be immediately expended in operating the arm 23 when the spring has been moved through its critical position. When the operating arm 25 is moved from its switch opening position in a clockwise direction, as viewed in Fig. 1, the spring 32 will be carried into another critical position so that upon further movement of the arm 25, the arm 23 will be moved to close the switch. Thus the spring 25 is tensioned as it is moved to each of its critical positions so that the switch will be opened and closed with a rapid snap action. In order to insure an effective snap actuation of the contact member in opening the switch, a latch 35 formed as a spring is secured to the upwardly extending portion of the supporting member 20 and is biased to engage the projecting portion 23b of the contact arm 23 so that when the switch is closed, as shown in Fig. 1, the latch will be in position to secure the arm 23 so that it cannot be prematurely moved from its switch closing position. It will be observed that the folded end of the spring 32 extends to and engages the latch 35 so that when the spring has been moved through its critical position in a switch opening direction, the folded end of the spring will have moved the latch 35 out of engagement with the portion 23a permitting the switch to rapidly open. It will be observed that this operation is not effected until the arm 25 has moved the axis of the spring across the aligned position of the projecting member 23b and the arm 25 when the arm 25 is moved in a counterclockwise direction to open the switch.

Suitable means are provided for moving the operating arm 25 to its critical positions so as to open and close the switch. As shown, the actuating lever 13 is pivotally mounted at one end to the casing 14, and is mechanically connected at its other end to the lever 25. As shown, the lever 25 is provided at its free end with an apertured depending portion, and the lever 13 is provided at its free end with a reduced portion extending through the aperture whereby the mechanical connection is effected. The actuating lever 13 is moved in a counterclockwise direction, as viewed in Fig. 1, by means of the diaphragm 11 and is moved in a clockwise direction, as viewed in Fig. 1, by means of the compression spring 12. A suitable member 41 serves to transmit motion from the diaphragm and spring to the lever 13. As shown, the member 41 serves as a lower spring seat for the spring 12; is pivotally connected to the actuating lever 13 at a point intermediate the ends of the lever; and is operably associated with the diaphragm 11 through the medium of a pressure plate 42, a diaphragm 43, a spacing member 44, and a pressure plate 45. The diaphragm 11 supports the spacer 44 and the pressure plate 45, a stud 46 serving to hold the spacer, the pressure plate and the diaphragm securely together. An enlarged washer 46a is inserted between the head of the stud 46 and the diaphragm 11. A suitable member 47 is rigidly secured to the member 41 and the pressure plate 43 so that positive motion may be imparted to the member 47 from the diaphragm 11.

The diaphragm 11 is provided with a suitable pressure chamber 48, secured to the casing 49 by means of stud bolts 50. The diaphragm 11 divides the chamber 48 into an upper portion 48a and a lower portion 48b. The upper portion 48a is provided with an inlet pipe 51 so that it may be connected to a source of pressure to be regulated, and the lower portion 48b is provided with an opening 52 leading to the atmosphere. Thus it will be observed that when the pressure in the upper portion 48a has been reduced to a sufficient value, the atmospheric pressure acting upon the diaphragm 11 will move the lever 13 in a counterclockwise direction, as viewed in Fig. 1, and the operating arm 25 will be moved in a switch opening direction. It will be further observed that when the pressure in the upper portion 48a builds up to a sufficient value, the force of the atmospheric pressure will be overcome both because of the increased pressure and because of the force exerted by the spring 12, and the lever 13 will be moved in a clockwise direction, as viewed in Fig. 1, to move the arm 25 in a switch closing direction. The switch, therefore, will be closed when the pressure of the system has been built up to a definite point, that is, to a value, which together with the spring 12 will be sufficient to move the operating arm 25 to its critical position in a switch closing direction, and the switch will be opened when the pressure has been reduced to a certain value, that is, to a value sufficiently small to permit the atmospheric pressure to move the arm 25 to its critical position in a switch opening direction against the force of the reduced pressure and that of the spring 12.

It will be observed, therefore, that the switch will be operated at a definite range of pressures, which range will depend upon the compression of the spring 12. In order to shift this pressure range, the spring 12 may be compressed to a greater or less degree. As shown, a stud bolt 60 is screwed into the casing 49, provided above the pressure chamber, and extends upwardly through the longitudinal axis of the compression spring 12. The compression spring 12 is provided with an upper seat 62, which rests against a cover member 63 which in turn rests against a washer 64. A nut 65 threaded upon the upper end of the bolt 60 serves as a stop against which the washer 64 rests. It will be observed that the cover 63 extends downwardly through an aperture provided for it in the upper wall of the casing 14, whereby the upper portion of the casing is securely held against lateral displacement. The compression of the spring may be changed by screwing the nut 65 upon the bolt. The bolt 60 is further provided with an abutment 66, comprising a pair of nuts threaded upon the bolt, for limiting the upward movement of the member 42 and thus limiting the upward movement of the diaphragm. It will be observed that by varying the compression of the spring 12, the pressures at which the switch will be actuated will be accordingly varied.

It will be observed however that by adjusting the compression of the spring 12 to shift the pressure range, the pressure range itself is not affected, that is, the difference between the upper and lower pressures will always remain the same regardless of the adjustment. It is often desirable to vary this pressure range and in order to do so a tension spring 70 is provided. As shown, the range adjusting spring 70 is formed as a coil, one end of the spring being pivotally connected to the actuating lever 13 by means of an ear 71 sheared downward from the lever, and the other end of the spring being pivotally connected to an adjusting screw 72 whereby ready adjustment of the spring tension may be effected. The spring 70 is arranged so that when the switch is in its closed position, as shown in Fig. 1, the longitudinal axis of the spring will intersect the axis of rotation of the actuating lever 13, so that when the lever is in the position shown, the spring will exert no force whatever tending to rotate the actuating lever. However, when the lever 13 is moved in a counterclockwise direction, as viewed in Fig. 1, that is, in a switch opening direction, the longitudinal axis of the spring 70 will no longer intersect the axis of rotation of the lever 13 and, therefore, the spring 70 will exert a force tending to rotate the lever 13, which force will be added to the force exerted by the spring 12. By increasing or decreasing the tension of the spring 70, its effect upon the force exerted by the spring 12 will be varied accordingly. Thus, by increasing the tension of the spring 70, the pressure within the vacuum system must be reduced to a lower degree in order to cause the switch to open while on the other hand by decreasing the tension of the spring 70 the pressure on the system need be reduced a lesser amount in order to cause the switch to open. It will be observed however, when the lever 13 is moved in a clockwise direction, as viewed in Fig. 1, toward its neutral position, that the spring 70 will exert a rotational force of decreasing magnitude upon the lever. At the instant the spring 32 has reached its critical position in a switch closing direction, the axis of the spring 70 will intersect the fixed axis about which the lever 13 swings so that the spring will no longer tend to produce rotation of the lever. The switch therefore will close at the same pressure as it would before the tension of the range adjusting spring had been changed. Thus it will be observed that regardless of the pressure at which the switch is set to open, the pressure at which it will close will remain substantially the same. It will be understood that the axis of the range adjusting spring may be such that it will not intersect the fixed pivot when the lever 13 is in its neutral position, but in this case any change in tension of the spring will then change both opening and closing pressures of the switch in unequal amounts and the pressure range will be thereby changed.

In operation it will be understood that the upper portion of the pressure chamber is connected to the pressure to be regulated so that the diaphragm will be exposed to this pressure. Assuming the pressure to be reduced to such a value that the diaphragm will be moved in an upward direction under the influence of the atmosphere, then the actuating lever 13 will be moved in a counterclockwise direction, as viewed in Fig. 1, against the force of the springs 12 and 70. The operating arm 25 will be swung in a counterclockwise direction to its critical position in a switch opening direction and at the same time tension the operating spring 32. When the spring 32 has been moved to its critical position and is just carried through it, the latch 35 will be moved to release the contact arm 23 and the switch will be quickly snapped to its open position. When the pressure in the system increases, the actuating lever 13 will be moved in a clockwise direction under the influence of the spring 12 and the operating member 25 will be moved to a position to carry the spring 32 through its critical position in a switch closing direction. When the lever 13 has been moved substantially to its neutral position, the spring 32 will be carried through its critical position and the switch will be snapped to its closed position. In order to shift the pressure range it is but necessary to screw the nut 65 upon the stud bolt 60, and in order to vary the pressure range it is but necessary to adjust the tension of the spring 70.

It will be observed that the pressure chamber just described has been provided to operate on a low pressure or vacuum system. It is desirable however, that the regulator may be operated on very high pressures and also that it may be changed from one system to the other without material change in its structure. In order to adapt the regulator just described to a high pressure system, I have devised a pressure chamber that may be substituted for the pressure chamber shown in Fig. 1. Referring to Fig. 2, I have shown a pressure chamber provided to operate on a high pressure system. This pressure chamber 80 is provided with an opening 81 which may be connected to the high pressure system to be regulated. As shown, it is simply necessary to remove the vacuum pressure chamber from the regulator and substitute therefor the high pressure chamber 80. It will be observed that the pressure to which the chamber 80 is connected will act directly against the diaphragm 43 in the same direction as did the atmospheric pressure through the medium of the diaphragm 11. Thus regardless of which chamber is used, the actuating pressure acts in the same direction to actuate the switch mechanism in an opening direction and in either case the switch mechanism is closed by means of the spring 12. The greater portion of the regulator structure is identical in either case, the only change being necessary to adapt the regulator to any pressure system being in the pressure chamber structure.

It will be observed that the pressure regulator is of extremely simple and durable construction. The enclosing casing 14 is of very light material in contrast to the ordinary heavy cast casings. The entire switching mechanism may be removed by simply removing the holding nut 16, and the pressure chambers may be readily removed by simply removing the studs 50. It will also be observed that the various seams of the casing may be readily sealed so that the operating members may be protected against moisture.

While I have described my invention as embodied in concrete form and as operating in a specific manner in accordance with the provisions of the patent statutes, it should be understood that I do not limit my invention thereto since various modifications thereof will suggest themselves to those skilled in the art without departing from the spirit of my invention the scope of which is set forth in the annexed claims.

What I claim as new and desire to secure by Letters Patent of the United States, is:

1. A pressure regulator comprising, an electric switch, a pivoted lever movable between two positions for operating said electric switch, a device operated in accordance with variations in pressure operably connected with said lever, a spring opposing the actuation of said lever by said device, and a second spring connected to be maintained under tension by said lever substantially in alignment with the pivot of said lever in one of said positions and out of alignment upon movement of the lever towards the other of said positions so as to modify the effectiveness of said first spring, only when the said lever is moved from said one position.

2. A pressure regulator comprising, a diaphragm exposed to a varying pressure, a compression spring for opposing the movement of said diaphragm in one direction, a pivoted lever arranged to be actuated by said diaphragm, between two positions corresponding to a lower limit and an upper limit of a definite range of pressures, cooperating switch contacts opened and closed by said lever, said contacts being operated by said lever at each of said positions, means for adjusting the compression of said spring to shift the said definite range of pressures, a second spring connected to be held under tension by said lever substantially in alignment with the pivot of said lever in one of said positions and out of said alignment upon movement of the lever towards the other of said positions, and means for adjusting the effectiveness of said second spring to vary one of said limits of pressure.

3. In a pressure regulator, a diaphragm exposed to a varying pressure, a spring for opposing the movement of said diaphragm in one direction, a lever pivotally supported at one end and operably associated at a point intermediate its ends with said diaphragm for movement between two positions, a pair of cooperating switch contacts, one of said switch contacts being operably connected to the other end of said lever whereby said contacts may be opened and closed upon movement of said lever between said positions, a tension spring operably connected to said lever so as to oppose the effectiveness of said first spring when said lever is moved from one of said positions towards the other, said tension spring being arranged so that its axis will intersect the axis of the pivotal support of said lever in said one position.

4. In a switch mechanism, the combination with a pivoted switch arm and an opposed pivoted operating arm for said switch arm, of a tension spring connecting said switch arm and said operating arm whereby said operating arm upon reverse movement to predetermined critical positions operates said switch arm to open and close said switch, and a latch biased to engage and lock said switch arm in its switch closing position, said spring being arranged to release said latch as said operating arm is moved through its critical position in a switch opening direction.

5. In a switch mechanism, the combination with a pivoted switch arm having a contact portion and a portion projecting from said contact portion at an angle thereto, of a latch biased to engage said projecting portion to lock said switch arm in its switch closing position, a pivoted operating arm for said switch arm, and a tension spring connecting the free end of said projecting portion and the free end of said operating arm, whereby said operating arm upon reverse movement to predetermined critical positions operates said switch arm to open and close said switch, said spring having one end thereof arranged to engage said latch so as to free said projecting member as said operating arm moves through its critical position in a switch opening direction.

6. A pressure regulator comprising an electric switch, an actuating lever arranged to open and close said switch, a compression spring opposing movement of said lever in a switch opening direction, a casing having a diaphragm operatively connected with said lever, a pressure chamber adapted to be connected to a source of variable pressure detachably connected to said casing, a diaphragm mounted within said chamber exposed on one side to said variable pressure and on the other side to atmospheric pressure, and operable connections between said second diaphragm and said first diaphragm whereby said lever is moved against the force of said compression spring in a switch opening direction under the influence of said atmospheric pressure when the variable pressure is reduced to a predetermined value.

7. A pressure regulator comprising, an electric switch, an operating lever arranged to open and close said switch upon movement of said lever in opposite directions to predetermined positions, a compression spring opposing movement of said lever in a switch opening direction, a casing having a diaphragm operatively connected with said lever, a pressure chamber detachably connected to said casing, a diaphragm of larger area than said first diaphragm mounted within and dividing said pressure chamber into two portions, one of said portions being open to the atmosphere and the other of said portions being adapted to be connected to a source of variable pressure, and operable connections between said second diaphragm and said first diaphragm whereby when the pressure in said second portion is reduced to a predetermined value said lever is moved against the force of said compression spring to its switch opening position under the influence of atmospheric pressure.

In witness whereof, I have hereunto set my hand this 27th day of July, 1928.

VINCENT W. LEONARD.